United States Patent
Oba et al.

(10) Patent No.: US 11,201,013 B2
(45) Date of Patent: *Dec. 14, 2021

(54) DIELECTRIC FILM AND ELECTRONIC COMPONENT

(71) Applicant: TDK CORPORATION, Tokyo (JP)

(72) Inventors: Yusuke Oba, Tokyo (JP); Raitarou Masaoka, Tokyo (JP); Shohei Fujii, Tokyo (JP); Maiko Shirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 16/830,884

(22) Filed: Mar. 26, 2020

(65) Prior Publication Data

US 2020/0312558 A1 Oct. 1, 2020

(30) Foreign Application Priority Data

Mar. 26, 2019 (JP) .............................. JP2019-059167

(51) Int. Cl.
    *C04B 35/495* (2006.01)
    *H01G 4/12* (2006.01)
    *H01G 4/10* (2006.01)

(52) U.S. Cl.
    CPC ......... *H01G 4/1254* (2013.01); *C04B 35/495* (2013.01)

(58) Field of Classification Search
    CPC ............................ C04B 35/495; H01G 4/1254
    See application file for complete search history.

(56) References Cited

U.S. PATENT DOCUMENTS

| 6,569,796 | B2 * | 5/2003 | Itakura ................... C04B 35/453 |
| | | | 501/135 |
| 9,567,263 | B2 * | 2/2017 | Masaoka ............... C04B 35/453 |
| 9,745,225 | B2 * | 8/2017 | Masaoka ............... C04B 35/495 |
| 9,748,018 | B2 * | 8/2017 | Masaoka ............... C04B 35/495 |
| 2003/0050179 | A1 * | 3/2003 | Itakura ................... C04B 35/495 |
| | | | 501/134 |
| 2011/0001586 | A1 | 1/2011 | Toyoda et al. |
| 2015/0274600 | A1 | 10/2015 | Masaoka et al. |
| 2016/0115084 | A1 * | 4/2016 | Masaoka ............... C04B 35/495 |
| | | | 501/135 |

(Continued)

FOREIGN PATENT DOCUMENTS

CN      1769243 A      5/2006
JP      05148005 A   *   6/1993

(Continued)

OTHER PUBLICATIONS

Jun. 29, 2021 Office Action issued in U.S. Appl. No. 16/829,137.

*Primary Examiner* — Karl E Group
(74) *Attorney, Agent, or Firm* — Oliff PLC

(57) ABSTRACT

A dielectric film comprises a complex oxide represented by a general formula xAO-yBO-zC$_2$O$_5$ as a main component, wherein A is at least one selected from barium, calcium and strontium, B is at least one selected from magnesium and zinc, C is at least one selected from niobium and tantalum, x, y and z satisfy relations: x+y+z=1.000, 0.375≤x≤0.563, 0.250≤y≤0.500, and x/3≤z≤(x/3)+1/9, and a full width at half maximum of a diffraction peak of a (110) plane of the complex oxide is 0.40° or more in an X-ray diffraction chart of the dielectric film.

3 Claims, 1 Drawing Sheet

(56) References Cited

U.S. PATENT DOCUMENTS

| | | | |
|---|---|---|---|
| 2016/0376198 A1* | 12/2016 | Masaoka | C04B 35/495 501/135 |
| 2016/0379732 A1* | 12/2016 | Masaoka | H01G 4/1254 106/286.2 |
| 2017/0275174 A1 | 9/2017 | Uchiyama et al. | |

FOREIGN PATENT DOCUMENTS

| | | | |
|---|---|---|---|
| JP | 06338221 A | * | 12/1994 |
| JP | H08-319162 A | | 12/1996 |
| JP | 2015-195342 A | | 11/2015 |
| JP | 2016-084268 A | | 5/2016 |
| KR | 2017-0110009 A | | 10/2017 |
| WO | 2009-069707 A1 | | 6/2009 |

* cited by examiner

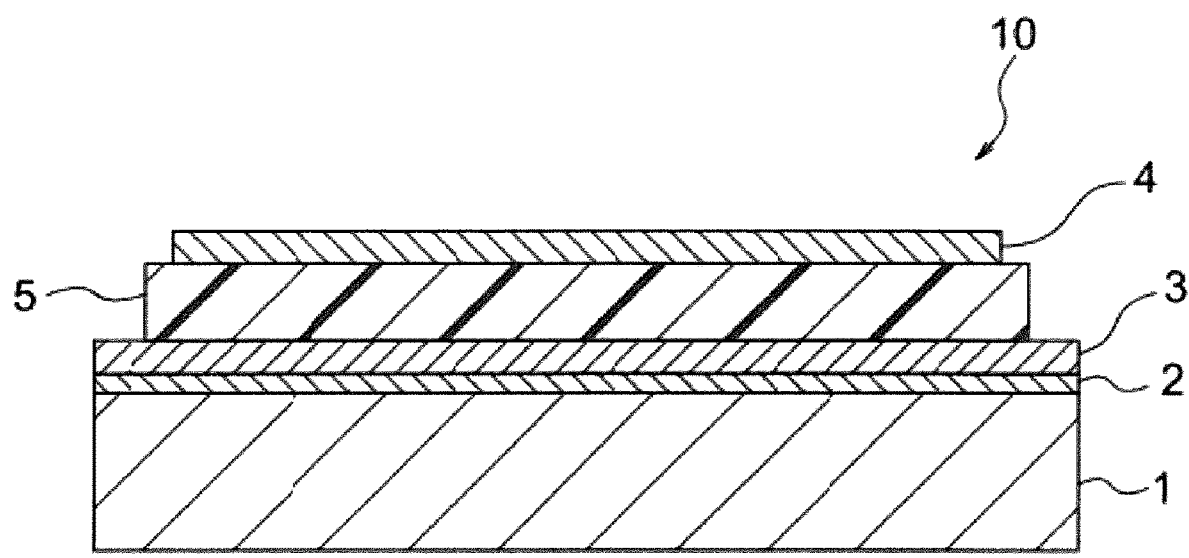

DIELECTRIC FILM AND ELECTRONIC COMPONENT

BACKGROUND OF THE INVENTION

Field of the Invention

The present invention relates to a dielectric film and electronic component.

Description of the Related Art

In recent years, the number of frequency regions used in mobile communication devices represented by mobile phones has increased to achieve high-speed and high-capacity communication. The frequency regions used are high frequency regions such as GHz bands. Some high frequency components operating in the high frequency regions such as baluns, couplers, filters and duplexers or diplexers in combination of filters use dielectric materials as resonators. Such a dielectric material is required to have a low dielectric loss and pass specific frequencies selectively in a high frequency region.

In other words, since the reciprocal of dielectric loss can be expressed as quality factor Q value, a dielectric material having a high quality factor Q value in a high frequency region is desired. A Q value is a reciprocal of the dielectric loss, in other words, the dielectric material having a high relative permittivity and a high Q value at high frequency band is demanded.

In Patent Document 1, a dielectric ceramic having a composition off a stoichiometric composition $Ba(Mg_{1/3}Ta_{2/3})O_3$, and a Q value of 40000 or more at 10 GHz is disclosed.

Patent Document 1: Japanese Patent Laid-Open No. 8-319162

The dielectric ceramic disclosed in Patent Document 1 is, however, a sintered body, which needs to have a sufficient volume to exhibit the dielectric properties shown in Patent Document 1. The disclosed dielectric ceramic, therefore, has the following problem: the size is too large as a dielectric material to be applied to high frequency components used in high frequency regions.

Also, size reduction of the dielectric material applied to a high frequency component, i.e., thinning the thickness of the dielectric material, tends to cause a decrease in the dielectric breakdown voltage. The decrease in the dielectric breakdown voltage causes the problem of an increase in the leak current.

It is an object of the present invention, in the light of these circumstances, to provide a dielectric film having a high dielectric breakdown voltage even when the dielectric film is a thin film.

BRIEF SUMMARY OF THE INVENTION

The aspects of the present invention to achieve the object are as follows.

[1] A dielectric film comprising a complex oxide represented by a general formula $xAO\text{-}yBO\text{-}zC_2O_5$ as a main component, wherein A is at least one selected from the group consisting of barium, calcium and strontium, B is at least one selected from the group consisting of magnesium and zinc, C is at least one selected from the group consisting of niobium and tantalum, x, y and z satisfy relations: $x+y+z=1.000$, $0.375 \leq x \leq 0.563$, $0.250 \leq y \leq 0.500$, and $x/3 \leq z \leq (x/3)+1/9$, and a full width at half maximum of a diffraction peak of a (110) plane of the complex oxide is 0.40° or more in an X-ray diffraction chart of the dielectric film.

[2] The dielectric film according to item [1], wherein the full width at half maximum of the diffraction peak of the (110) plane is 0.40° or more and 6.00° or less.

[3] An electronic component comprising the dielectric film according to item [1] or [2].

According to the present invention, a dielectric film having a high dielectric breakdown voltage can be provided even when the dielectric film is a thin film.

BRIEF DESCRIPTION OF THE DRAWING

The FIGURE is a schematic cross-sectional view of a thin film capacitor as an example of electronic components in an embodiment of the present invention.

DETAILED DESCRIPTION OF THE INVENTION

The present invention will be described in detail based on specific embodiments in the following order.
1. Thin film capacitor
   1. 1. Overall structure of thin film capacitor
   1. 2. Dielectric film
      1. 2. 1. Complex oxide
   1. 3. Substrate
   1. 4. Lower electrode
   1. 5. Upper electrode
2. Method for manufacturing thin film capacitor
3. Summary of the present embodiment
4. Modified example

1. Thin Film Capacitor

First, as an electronic component according to the present embodiment, a thin film capacitor in which a dielectric layer is constituted from a thin dielectric film is explained.

(1. 1. Overall structure of thin film capacitor)

As shown in the FIGURE, a thin film capacitor 10 as an example of the electronic component according to the present embodiment has a constitution in which a substrate 1, a lower electrode 3, a dielectric film 5, and an upper electrode 4 are stacked in this order. The lower electrode 3, the dielectric film 5, and the upper electrode 4 form a capacitor part and when the lower electrode 3 and the upper electrode 4 are connected to an external circuit and voltage is applied, the dielectric film 5 exhibits a predetermined capacitance, thereby the capacitor part function as a capacitor. Each constitution element will be discussed in detail in below.

Also, in the present embodiment, an underlayer 2 is formed between the substrate 1 and the lower electrode 3 in order to improve adhesiveness between the substrate 1 and the lower electrode 3. A material constituting the underlayer 2 is not particularly limited as long as the adhesiveness between the substrate 1 and the lower electrode 3 can be sufficiently secured. For example, when the lower electrode 3 is constituted from Cu, the underlayer 2 can be constituted from Cr; and when the lower electrode 3 is constituted from Pt, the underlayer 2 can be constituted from Ti.

Also, in the thin film capacitor 10 shown in the FIGURE, a protective film may be formed for blocking the dielectric film 5 from external atmosphere.

Note that, a shape of a thin film capacitor is not particularly limited, and usually it is rectangular parallelepiped shape. Also, a size of the thin film capacitor is not particularly limited, and a thickness and a length may be determined appropriately depending on the purpose of use.

(1. 2. Dielectric Film)

The dielectric film 5 contains a complex oxide to be described later as a main component. In the present embodiment, the main component is a component which accounts for 50 mol % or more in 100 mol % of the dielectric film.

In the present embodiment, the dielectric film 5 is a thin film formed by a known film formation method. Since such a thin film is usually formed by deposition of atoms on a substrate, the dielectric film is preferably a deposited film of dielectric material. The dielectric film does not include a sintered body obtained by firing a green compact of raw material powder of dielectric material (by a solid-state reaction).

The thickness of the dielectric layer 5 is preferably 10 nm to 4000 nm, and more preferably 50 nm to 3000 nm. When the dielectric film 5 is too thin, an insulation breakdown of the dielectric film 5 tends to easily occur. If the insulation breakdown occurs, a capacitor cannot exhibit its function. On the other hand, when the dielectric film 5 is too thick, the electrode area needs to be enlarged to increase the capacitance of the capacitor, so that size and height reduction of electronic components may become difficult depending on the design.

Note that, the thin film capacitor including the dielectric film 5 is processed using FIB (Focused Ion Beam) processing device and the obtained cross section is observed using SEM (Scanning Electron Microscope) and the like, thereby the thickness of the dielectric film 5 can be measured.

(1. 2. 1. Complex Oxide)

The complex oxide is an oxide containing an element A, an element B and an element C, represented by a general formula $xAO\text{-}yBO\text{-}zC_2O_5$. In the present embodiment, each of the element A and the element B comprises a divalent element and the element C comprises a pentavalent element.

In the general formula, "x" represents the proportion of the number of moles of an oxide AO in 1.000 mole of the complex oxide. In the similar manner, in the general formula, "y" represents the proportion of the number of moles of an oxide BO in 1.000 mole of the complex oxide, and "z" represents the proportion of the number of moles of an oxide $C_2O_5$ in 1.000 mole of the complex oxide.

In the present embodiment, "x", "y" and "z" satisfy relations: $x+y+z=1.000$, $0.375 \leq x \leq 0.563$, $0.250 \leq y \leq 0.500$, and $x/3 \leq z \leq (x/3)+1/9$.

When "x" is a too small, the Q value tends to decrease. On the other hand, when "x" is a too large, the excessive element A easily reacts with carbon dioxide, moisture and the like in the atmosphere, so that the shape retention tends to be difficult due to deterioration of the dielectric film.

When "y" is a too small, the element A is prone to be relatively excessive, so that the tendency described above is shown. When "y" is a too large, cracks tend to occur in the dielectric film.

When "z" is a too small, the element A is prone to be relatively excessive, so that the tendency described above is shown. When "z" is a too large, the element C becomes excessive, so that oxygen defects tend to occur in the dielectric film, which tends to be semi-conductive.

In the present embodiment, the element A is at least one selected from the group consisting of barium (Ba), calcium (Ca) and strontium (Sr). It is preferable that the element A contain at least barium, and in that case, the element A is barium or barium and at least one selected from the group consisting of calcium and strontium. Containing at least barium as the element A tends to result in improvement in the dielectric breakdown voltage and the Q value.

In the present embodiment, the element B is at least one selected from the group consisting of magnesium (Mg) and zinc (Zn). It is preferable that the element B contain at least magnesium, and in that case, the element B is magnesium or magnesium and zinc. Containing at least magnesium as the element B tends to result in improvement in the dielectric breakdown voltage and the Q value.

In the present embodiment, the element C is at least one selected from the group consisting of niobium (Nb) and tantalum (Ta). It is preferable that the element C contain at least tantalum, and in that case, the element C is tantalum or tantalum and niobium. Containing at least tantalum as the element C tends to result in improvement in the dielectric breakdown voltage and the Q value.

In the present embodiment, in the X-ray diffraction chart obtained by X-ray diffraction measurement of the dielectric film, a full width at half maximum of the diffraction peak of the (110) plane of the complex oxide is 0.40° or more. The full width at half maximum (FWHM) is calculated as the spread of a peak at half of the peak intensity.

The full width at half maximum is an index of crystallinity. Small FWHM means that the complex oxide has high crystallinity, while large FWHM means that the complex oxide has low crystallinity. In the present embodiment, by having the FWHM within the range described above, the crystallinity of the complex oxide can be controlled to improve the dielectric breakdown voltage of the dielectric film.

The FWHM of the diffraction peak of the (110) plane is preferably 6.00° or less, more preferably 4.00° or less. By controlling the upper limit of the full width at half maximum of the diffraction peak of the (110) plane to the value described above, the dielectric breakdown voltage of the dielectric film is maintained high and the complex oxide is prevented from being excessively amorphized, so that the Q value of the dielectric film can be equal to or higher than a predetermined value.

In the case of using Cu-Kα radiation as X-ray source, the diffraction peak of the (110) plane appears at a diffraction angle $2\theta$ of around 30°.

The control of the full width at half maximum of the complex oxide may be performed, for example, by the type of a film formation method, the substrate temperature in film formation, the energy given in film formation, and the atmosphere in film formation.

Also, the dielectric film according to the present embodiment may include a trace amount of impurities, subcomponents, and the like as long as the present invention can exhibit its effect.

(1. 3. Substrate)

The substrate shown in the FIGURE is not particularly limited as long as it is constituted from a material having mechanical strength which can support the underlayer 2, the lower electrode 3, the dielectric film 5, and the upper electrode 4 which are formed on the substrate 1. For example, a single crystal substrate constituted from Si single crystal, SiGe single crystal, GaAs single crystal, InP single crystal, $SrTiO_3$ single crystal, MgO single crystal, $LaAlO_3$ single crystal, $ZrO_2$ single crystal, $MgAl_2O_4$ single crystal, $NdGaO_3$ single crystal, and the like; a ceramic polycrystal substrate constituted from $Al_2O_3$ polycrystal, ZnO polycrystal, $SiO_2$ polycrystal, and the like; a metal substrate constituted from metals such as Ni, Cu, Ti, W, Mo, Al, Pt, an alloy of these; and like may be mentioned. In the present embodiment, from the point of low cost and processability, Si single crystal is used as the substrate.

A thickness of the substrate 1 is for example between 10 μm to 5000 μm. When it is too thin, a mechanical strength may not be enough in some case, and when it is too thick, in some case the electronic component cannot be made compact.

The above-mentioned substrate 1 has a different resistivity depending on the material of the substrate. When the substrate is constituted by the material having a low resistivity, current may leak towards the substrate side while the thin film capacitor is running, and this may affect the electric properties of the thin film capacitor. Thus, when the resistivity of the substrate 1 is low, preferably an insulation treatment is performed to the surface of the substrate 1 so that current does not leak towards the substrate 1 side while the capacitor is running.

For example, when Si single crystal is used as the substrate 1, an insulation layer is preferably formed on the surface of the substrate 1. As long as the substrate 1 and the capacitor part are sufficiently insulated, the material constituting the insulation layer and the thickness of the insulation layer are not particularly limited. In the present embodiment, as the material constituting the insulation layer, $SiO_2$, $Al_2O_3$, $Si_3N_x$, and the like may be mentioned as examples. Also, the thickness of the insulation layer is preferably 0.01 μm or more.

(1. 4. Lower electrode)

As shown in the FIGURE, the lower electrode 3 is formed in a thin film form on the substrate 1 via the underlayer 2. The dielectric film 5 is placed between the lower electrode 3 and the upper electrode 4 which is described in below and the lower electrode 3 is an electrode which allows the dielectric film 5 to function as a capacitor. The material constituting the lower electrode 3 is not particularly limited as long as it has conductivity. For example, metals such as Pt, Ru, Rh, Pd, Ir, Au, Ag, Cu, and the like; the alloy thereof; or a conductive oxide; and the like may be mentioned.

A thickness of the lower electrode 3 is not particularly limited as long as the lower electrode 3 functions as an electrode. In the present embodiment, the thickness is preferably 0.01 μm or more.

(1. 5. Upper electrode)

As shown in the FIGURE, the upper electrode 4 is formed in a thin film form on the surface of the dielectric film 5. The dielectric film 5 is placed between the upper electrode 4 and the lower electrode 3 and the upper electrode 4 is an electrode which allows the dielectric film 5 to function as a capacitor. Therefore, the upper electrode 4 and the lower electrode 3 have a different polarity.

As similar to the lower electrode 3, a material constituting the upper electrode 4 is not particularly limited as long as it has conductivity. For example, metals such as Pt, Ru, Rh, Pd, Ir, Au, Ag, Cu, and the like; the alloy thereof; or a conductive oxide; and the like may be mentioned.

2. Method for Manufacturing Thin Film Capacitor

Next, an example of the method for manufacturing a thin film capacitor 10 shown in the FIGURE is described as follows.

First, the substrate 1 is prepared. As the substrate 1, for example when using a Si single crystal substrate, an insulation layer is formed on one of a main face of the substrate. As a method for forming the insulation layer, a known method for forming a film such as a thermal oxidation method, a CVD (Chemical Vapor Deposition) method, and the like may be used.

Next, a thin film made of a material constituting an underlayer is formed on the insulation layer which has been formed using a known method for forming a film thereby the underlayer 2 is formed.

After the underlayer 2 is formed, a thin film made of a material constituting a lower electrode is formed on the underlayer 2 using a known method for forming a film thereby the lower electrode 3 is formed.

After the lower electrode 3 is formed, a heat treatment may be carried out in order to improve adhesiveness between the underlayer 2 and the lower electrode 3 and also to improve a stability of the lower electrode 3. As a heat treatment condition, for example a temperature rising rate is preferably 10° C./min to 2000° C./min and more preferably 100° C./min to 1000° C./min. A holding temperature during the heat treatment is preferably 400° C. to 800° C. and a holding time is preferably 0.1 hour to 4.0 hours. When the heat treatment condition is out of the above-mentioned range, the underlayer 2 and the lower electrode 3 may not adhere sufficiently and also the surface of the lower electrode 3 easily becomes rough. As a result, the dielectric properties of the dielectric film 5 tend to easily decrease.

Next, the dielectric film 5 is formed on the lower electrode 3. In the present embodiment, the dielectric film 5 is formed as a deposition film of which the material constituting the dielectric film 5 is deposited in a film form on the lower electrode 3 by a known method for forming a film.

Examples of the known film formation method include a vacuum deposition method, a sputtering method, a pulse laser deposition (PLD) method, a metal organic chemical vapor deposition (MO-CVD) method, a metal organic decomposition (MOD) method, a sol-gel method, and a chemical solution deposition (CSD) method. In the present embodiment, the sputtering method is preferred from the viewpoints of cost and easiness of obtaining a high dielectric breakdown voltage. For example, in the case of forming a thin film by PLD, generation of droplets in film formation tends to cause a decrease in the dielectric breakdown voltage of the resulting dielectric film.

Although a trace amount of impurities, subcomponents and the like may be contained in the raw materials to be used in film formation (vapor deposition materials, various target materials, organometallic materials, etc.) in some cases, there are no problems in particular, so long as desired dielectric properties can be obtained.

In the case of using the sputtering method, a target having a desired composition is used to form the dielectric film on the lower electrode. In the present embodiment, in order to control the FWHM of the complex oxide within the range described above, for example, it is preferable that the substrate temperature be relatively low. An excessively large input electric power in sputtering tends to result in a too small FWHM, while an excessively small input electric power tends to result in a too large FWHM. These film formation conditions may be appropriately combined.

Next, a thin film of material constituting the upper electrode is formed by a known method for forming a film on the dielectric film 5 which has been formed; thereby the upper electrode 4 is formed.

By going through the above-mentioned steps, the thin film capacitor 10 having a capacitor part (the lower electrode 3, the dielectric film 5, and the upper electrode 4) on the substrate 1 as shown in the FIGURE can be obtained. Note that, a protective film for protecting the dielectric film 5 may be formed so as to cover at least part of the dielectric film 5 which is exposed to outside using a known method for forming a film.

3. Summary of the Present Embodiment

As the main component of the dielectric film obtained by a film formation method, the present embodiment focuses on a complex oxide including an element A selected from barium, calcium and strontium, an element B selected from magnesium and zinc, and an element C selected from niobium and tantalum.

In addition to composition optimization of the complex oxide with proportion of each of the element A, the element B and the element C controlled within the range described above, the full width at half maximum of the specified diffraction peak of the complex oxide is controlled within the range described above. As a result, the dielectric breakdown voltage of the dielectric film can be improved.

Since an orientation of crystallites in a thin film formed by a film formation method can be easily controlled, in the usual case of forming a thin film by a film formation method, a thin film having high crystallinity is formed. In other words, a thin film having a small FWHM is formed.

The present inventors, however, have found that a thin film with a slightly low crystallinity containing an amorphous region has more improved a dielectric breakdown voltage than a thin film having high crystallinity.

In order to achieve improvements in both of the dielectric breakdown voltage and the Q value, the upper limit of the FWHM is set to prevent the amorphous region from excessively increasing.

4. Modified Example

In the present embodiment, a dielectric film constituting only the dielectric film according to the present embodiment has been described, however, an electronic component may have a multilayer structure with combination of the dielectric film according to the present embodiment and a film of another dielectric composition. For example, a multilayer structure including an existing amorphous dielectric film such as $Si_3N_x$, $SiO_x$, $Al_2O_x$, $ZrO_x$, and $Ta_2O_x$ or a crystal film enables control of temperature change in the impedance and the relative permittivity of the dielectric film 5.

Also, an electronic component may be a multilayer capacitor having a plurality of the dielectric films in the present embodiment.

In the above embodiment, the underlayer is formed to improve the adhesiveness between the substrate and the lower electrode, however when the adhesiveness between the substrate and the lower electrode can be secured sufficiently, and then the underlayer may be omitted. Also, when metals such as Cu, Pt, and the like; an alloy thereof; a conductive oxide; and the like which can be used as an electrode is used as the material constituting the substrate, then the underlayer and the lower electrode can be omitted.

Although the embodiment of the present invention has been described above, the present invention is not limited to the embodiment and various modifications may be made within the scope of the present invention.

EXAMPLES

The present invention is further described in detail with reference to Examples and Comparative Examples. The present invention is, however, not limited to the following Examples.

Example 1 and Comparative Example 1

First, a target required for forming a dielectric film was made as follows.

Each powder of barium carbonate ($BaCO_3$), calcium carbonate ($CaCO_3$) and strontium carbonate ($SrCO_3$) was prepared as the raw material powder of the element A; each powder of magnesium oxide (MgO) and zinc oxide (ZnO) was prepared as the raw material powder of the element B; and each powder of niobium oxide ($Nb_2O_5$) and tantalum oxide ($Ta_2O_5$) was prepared as the raw material powder of the element C. Each of the powders was weighed so as to satisfy compositions of Example 1 and Comparative Example 1.

The weighed raw material powder of the element B, the weighed raw material powder of the element C, water and $ZrO_2$ beads having a diameter of 2 mm were put in a wide mouth polypropylene pot having a capacity of 1 L and wet mixing was carried out for 20 hours. The mixed powder slurry was then dried at 100° C. for 20 hours. The resulting mixed powder was put in a crucible made of $Al_2O_3$ and subjected to primary calcination under firing conditions at a holding temperature of 1250° C. for 5 hours in air atmosphere, so that a primarily calcined powder containing a complex oxide of the element B and the element C was obtained.

The resulting primarily calcined powder, the raw material powder of the element A, water and $ZrO_2$ beads having a diameter of 2 mm were put in a wide mouth polypropylene pot having a capacity of 1 L and wet mixing was carried out for 20 hours. The mixed powder slurry was then dried at 100° C. for 20 hours. The resulting mixed powder was put in a crucible made of $Al_2O_3$ and subjected to secondary calcination under firing conditions at a holding temperature of 1050° C. for 5 hours in air atmosphere, so that a secondarily calcined powder containing a complex oxide of the element A, the element B and the element C was obtained.

Although an $AO-C_2O_5$ compound without containing the element B inhibits generation of the desired $AO-BO—C_2O_5$, the two-step calcination can prevent generation of the $AO-C_2O_5$ compound.

The resulting secondarily calcined powder was put in a mortar and a water solution of polyvinyl alcohol (PVA) at a concentration of 6 wt % as a binder was added to 10 wt % relative to the secondarily calcined powder so as to make a granulated powder by using a pestle. The resulting granulated powder was put in a press mold having a diameter of 100 mm to obtain a green compact with a thickness of about 5 mm by pressure molding using a uniaxial pressing machine. As the molding conditions, the pressure was set at $2.0 \times 10^8$ Pa, and the temperature was set at room temperature.

The resulting green compact was subjected to a binder removal treatment at a temperature rising rate of 100° C./hour and a holding temperature of 400° C., for a temperature holding time of 4 hours in an air atmosphere under normal pressure. Subsequently, the green compact was subjected to firing at a temperature rising rate of 200° C./hour and a holding temperature of 1600° C. to 1700° C., for a temperature holding time of 12 hours in an air atmosphere under normal pressure, so that a sintered body was obtained.

Both surfaces of the obtained sintered body were polished using a cylindrical grinder so that the thickness of the obtained sintered body was 4 mm, thereby the target for forming the dielectric film was obtained.

Next, a square substrate of 10 mm×10 mm having a $SiO_2$ insulation layer with a thickness of 6 μm on a surface of the Si single crystal substrate with a thickness of 350 μm was prepared. To the surface of this substrate, a Ti thin film having a thickness of 20 nm as an underlayer was formed by a sputtering method.

Next, on the Ti thin film formed in above, a Pt thin film as the lower electrode having a thickness of 100 nm was formed by a sputtering method.

The formed Ti/Pt thin film was subjected to a heat treatment at a temperature rising rate of 400° C./min and a holding temperature of 700° C. for a temperature holding time of 30 minutes in an oxygen atmosphere under normal pressure.

After the heat treatment, a dielectric film was formed on the Ti/Pt thin film. In the present example, except for sample No. 26, the dielectric film was formed so as to have a thickness of 1000 nm on the lower electrode by the sputtering method using the target made as described above. In the film formation by the sputtering method, conditions on the substrate temperature, the input electric power during sputtering and the film formation pressure shown in Table 1 were employed. In order to expose a part of the lower electrode, a metal mask was used to form a region where the dielectric film was not formed.

In regard to sample No. 26, a dielectric film was formed so as to have a thickness of 1000 nm on the lower electrode by a PLD method using the target made as described above. As the film formation conditions, the film formation pressure was set to $1 \times 10^{-1}$ (Pa) and the substrate temperature was set to 200° C. In the same manner as in sample No. 1 to 25, in order to expose a part of the lower electrode, a metal mask was used to form a region where the dielectric film was not formed.

Next, an Ag thin film as an upper electrode was formed on the obtained dielectric film using a deposition machine. The upper electrode is formed so as to have a shape having a diameter of 100 μm and a thickness of 100 nm using the metal mask. Thereby, the thin capacitors (sample Nos. 1 to 26) having the constitution shown in FIG. 1 were obtained.

Note that, a composition of the dielectric film was analyzed using X-ray fluorescence (XRF) element analysis for all of the samples to confirm that the composition matched the composition shown in Table 1. The thickness of the dielectric film was obtained by processing the thin film capacitor by FIB and observing the resulting cross-section by a scanning electron microscope (SEM).

The XRD measurement of the dielectric film of each of the all thin film capacitor samples obtained was performed by the following method. Also, the Q value and the dielectric breakdown voltage of the dielectric film were measured by the following method.

(Xrd Measurement)

The XRD measurement of the dielectric film was performed to identify the diffraction peak of the (110) plane in the X-ray diffraction chart obtained, and the full width at half maximum of the peak was calculated. The results are shown in Table 1.

The XRD measurement was performed using Cu-Kα radiation as X-ray source under measurement conditions at a voltage of 45 kV and a current of 200 mA, in the range of 2θ=20° to 90°.

(Dielectric Breakdown Voltage)

The dielectric breakdown voltage (Vbd) was measured as follows. A super insulation meter (HIOKI SM7120) was connected to the region where the lower electrode is exposed and the upper electrode of the thin film capacitor, and then applied a voltage at a step of 5 V/s for the measurement of the resistance value. The voltage value corresponding to the two-digit decrease from the initial resistance value was defined as the breakdown voltage value (V) and the obtained breakdown voltage value (V) divided by the dielectric film thickness was defined as the dielectric breakdown voltage (Vbd) (V/μm). In the present example, the dielectric breakdown voltage of five thin film capacitors was measured for each sample, and the average was defined as the dielectric breakdown voltage of each sample. In the present example, a higher dielectric breakdown voltage is preferred, and the samples having a dielectric breakdown voltage of 500 V/μm or more were determined to be good. The results are shown in Table 1.

(Q Value)

The Q value was defined as the reciprocal of dielectric loss (tan δ) of the thin film capacitor measured at a reference temperature of 25° C. under conditions at a frequency of 2 GHz and an input signal level (measurement voltage) of 0.5 Vrms using an RF impedance/material analyzer (4991A manufactured by Agilent Technologies, Inc.). In the present example, a higher Q value is preferred, and the samples having a Q value of 350 or more were determined to be good. The results are shown in table 1.

TABLE 1

| | | xAO—yBO—$zC_2O_5$ | | | | | | Film formation condition | | | XRD | Properties | |
|---|---|---|---|---|---|---|---|---|---|---|---|---|---|
| | | AO | | | BO | | $C_2O_5$ | Substrate temper- | Input electric | | Full width at half | Dielectric breakdown | |
| | Sample No. | Ba | Ca | Sr | Mg | Zn | Nb Ta | ature ° C. | power W | Pressure Pa | maximum (°) | voltage Vbd (V/μm) | Q value |
| | | | x | | y | | z | | | | | | |
| Example 1 | 1 | 0.563 | 0.000 | 0.000 | 0.250 | 0.000 | 0.000 0.188 | 200° C. | 400 W | 0.1 Pa | 0.68 | 600 | 518 |
| | 2 | 0.469 | 0.000 | 0.000 | 0.375 | 0.000 | 0.000 0.156 | 200° C. | 400 W | 0.1 Pa | 0.68 | 595 | 507 |
| | 3 | 0.375 | 0.000 | 0.000 | 0.500 | 0.000 | 0.000 0.125 | 200° C. | 400 W | 0.1 Pa | 0.65 | 578 | 496 |
| | 4 | 0.375 | 0.000 | 0.000 | 0.445 | 0.000 | 0.000 0.181 | 200° C. | 400 W | 0.1 Pa | 0.53 | 567 | 488 |
| | 5 | 0.375 | 0.000 | 0.000 | 0.389 | 0.000 | 0.000 0.236 | 200° C. | 400 W | 0.1 Pa | 0.92 | 601 | 479 |
| | 6 | 0.427 | 0.000 | 0.000 | 0.319 | 0.000 | 0.000 0.253 | 200° C. | 400 W | 0.1 Pa | 1.50 | 584 | 461 |
| | 7 | 0.479 | 0.000 | 0.000 | 0.250 | 0.000 | 0.000 0.271 | 200° C. | 400 W | 0.1 Pa | 2.04 | 616 | 443 |
| | 8 | 0.521 | 0.000 | 0.000 | 0.250 | 0.000 | 0.000 0.229 | 200° C. | 400 W | 0.1 Pa | 1.89 | 624 | 481 |
| | 9 | 0.472 | 0.000 | 0.000 | 0.354 | 0.000 | 0.000 0.174 | 200° C. | 400 W | 0.1 Pa | 0.63 | 610 | 508 |
| | 10 | 0.472 | 0.000 | 0.000 | 0.354 | 0.000 | 0.000 0.174 | 200° C. | 540 W | 0.1 Pa | 0.45 | 505 | 494 |
| | 11 | 0.472 | 0.000 | 0.000 | 0.354 | 0.000 | 0.000 0.174 | 200° C. | 315 W | 0.1 Pa | 5.70 | 526 | 376 |

TABLE 1-continued

| | | xAO—yBO—zC$_2$O$_5$ | | | | | | Film formation condition | | | XRD | Properties | |
| | | AO | | | BO | | C$_2$O$_5$ | Substrate temperature ° C. | Input electric power W | Pressure Pa | Full width at half maximum (°) | Dielectric breakdown voltage Vbd (V/μm) | Q value |
| | Sample No. | Ba x | Ca | Sr | Mg y | Zn | Nb z | Ta | | | | | | |
|---|---|---|---|---|---|---|---|---|---|---|---|---|---|---|
| | 12 | 0.000 | 0.472 | 0.000 | 0.354 | 0.000 | 0.000 | 0.174 | 200° C. | 400 W | 0.1 Pa | 3.20 | 531 | 460 |
| | 13 | 0.000 | 0.000 | 0.472 | 0.354 | 0.000 | 0.000 | 0.174 | 200° C. | 400 W | 0.1 Pa | 2.68 | 586 | 463 |
| | 14 | 0.472 | 0.000 | 0.000 | 0.000 | 0.354 | 0.000 | 0.174 | 200° C. | 400 W | 0.1 Pa | 4.71 | 579 | 354 |
| | 15 | 0.472 | 0.000 | 0.000 | 0.354 | 0.000 | 0.174 | 0.000 | 200° C. | 400 W | 0.1 Pa | 1.90 | 547 | 358 |
| | 16 | 0.472 | 0.000 | 0.000 | 0.354 | 0.000 | 0.000 | 0.174 | 200° C. | 270 W | 0.1 Pa | 6.50 | 528 | 361 |
| Comparative Example 1 | 17 | 0.643 | 0.000 | 0.000 | 0.143 | 0.000 | 0.000 | 0.214 | 200° C. | 400 W | 0.1 Pa | Unmeasurable | Unmeasurable | Unmeasurable |
| | 18 | 0.604 | 0.000 | 0.000 | 0.250 | 0.000 | 0.000 | 0.146 | 200° C. | 400 W | 0.1 Pa | Unmeasurable | Unmeasurable | Unmeasurable |
| | 19 | 0.375 | 0.000 | 0.000 | 0.556 | 0.000 | 0.000 | 0.070 | 200° C. | 400 W | 0.1 Pa | Unmeasurable | Unmeasurable | Unmeasurable |
| | 20 | 0.332 | 0.000 | 0.000 | 0.557 | 0.000 | 0.000 | 0.111 | 200° C. | 400 W | 0.1 Pa | 0.71 | 512 | 348 |
| | 21 | 0.332 | 0.000 | 0.000 | 0.446 | 0.000 | 0.000 | 0.222 | 200° C. | 400 W | 0.1 Pa | 1.02 | 564 | 309 |
| | 22 | 0.375 | 0.000 | 0.000 | 0.334 | 0.000 | 0.000 | 0.292 | 200° C. | 400 W | 0.1 Pa | 1.24 | 598 | 128 |
| | 23 | 0.438 | 0.000 | 0.000 | 0.250 | 0.000 | 0.000 | 0.324 | 200° C. | 400 W | 0.1 Pa | 1.46 | 622 | 82 |
| | 24 | 0.560 | 0.000 | 0.000 | 0.143 | 0.000 | 0.000 | 0.312 | 200° C. | 400 W | 0.1 Pa | 1.70 | 609 | 71 |
| | 25 | 0.472 | 0.000 | 0.000 | 0.354 | 0.000 | 0.000 | 0.174 | 450° C. | 400 W | 0.1 Pa | 0.20 | 317 | 470 |
| | 26 | 0.465 | 0.000 | 0.000 | 0.328 | 0.000 | 0.000 | 0.208 | 200° C. | 50 mJ (PLD) | 0.1 Pa | 0.18 | Unmeasurable | 567 |

From Table 1, it was confirmed that samples having relations among "x", "y" and "z" in the range described above and the full width at half maximum of the diffraction peak of the (110) plane satisfying the range described above, were able to achieve improvements in both of the dielectric breakdown voltage and the Q value.

On the other hand, it was confirmed that even though the relations among "x", "y" and "z" were in the range described above, the dielectric breakdown voltage was low without the full width at half maximum of the diffraction peak of the (110) plane satisfying the range described above. It was also confirmed that the samples having the relations among "x", "y" and "z" out of the range described above had a low Q value.

Further, it was confirmed that in the case of forming by PLD under the conditions described in Table 1, the full width at half maximum of the diffraction peak of the (110) plane did not satisfy the range described above and the dielectric breakdown voltage was low due to the generation of droplets in film formation.

Note that, measurements of the FWHM, the dielectric breakdown voltage and the Q value of the samples Nos. 17 to 19 were unable to be performed, because the samples having a film form immediately after film formation collapsed with passage of time.

Example 2

Dielectric films were formed under the same conditions as in Example 1, except that the thickness of the dielectric film of sample No. 9 was changed to the thickness shown in Table 2, and the dielectric films were evaluated under the same conditions as in Example 1. The results are shown in Table 2.

TABLE 2

| | | xAO—yBO—zC$_2$O$_5$ | | | | | | | Film formation condition | | | | XRD | Properties | |
| | | AO | | | BO | | C$_2$O$_5$ | | Substrate temperature ° C. | Input electric power W | Pressure Pa | Film thickness (μm) | Full width at half maximum (°) | Dielectric breakdown voltage Vbd (V/μm) | Q value |
| | Sample No. | Ba x | Ca | Sr | Mg y | Zn | Nb z | Ta | | | | | | | |
|---|---|---|---|---|---|---|---|---|---|---|---|---|---|---|---|
| Example 1 | 9 | 0.472 | 0.000 | 0.000 | 0.354 | 0.000 | 0.000 | 0.174 | 200° C. | 400 W | 0.1 Pa | 1000 | 0.60 | 610 | 508 |
| Example 2 | 27 | 0.472 | 0.000 | 0.000 | 0.354 | 0.000 | 0.000 | 0.174 | 200° C. | 400 W | 0.1 Pa | 2000 | 0.62 | 609 | 640 |
| | 28 | 0.472 | 0.000 | 0.000 | 0.354 | 0.000 | 0.000 | 0.174 | 200° C. | 400 W | 0.1 Pa | 3000 | 0.60 | 609 | 639 |

It was confirmed that even with a thickness of the dielectric film shown in Table 2, the same properties were obtained.

According to the present invention, a dielectric film having a high dielectric breakdown voltage can be obtained. Such a dielectric film in a thin film form is suitably applied to electronic components for high frequency such as baluns, couplers, filters and duplexers or diplexers in combination of filters.

REFERENCE SIGN LIST

10 . . . Thin film capacitor
1 . . . Substrate
2 . . . Underlayer
3 . . . Lower electrode
4 . . . Upper electrode
5 . . . Dielectric film

What is claimed is:

1. A dielectric film comprising a complex oxide represented by a general formula xAO-yBO-zC$_2$O$_5$ as a main component, wherein
- A is at least one selected from the group consisting of barium, calcium and strontium,
- B is at least one selected from the group consisting of magnesium and zinc,
- C is at least one selected from the group consisting of niobium and tantalum,
- x, y and z satisfy relations: x+y+z=1.000, 0.375≤x≤0.563, 0.250≤y≤0.500, and x/3≤z≤(x/3)+1/9, and
- a full width at half maximum of a diffraction peak of a (110) plane of the complex oxide is 0.40° or more in an X-ray diffraction chart of the dielectric film.

2. The dielectric film according to claim 1, wherein the full width at half maximum of the diffraction peak of the (110) plane is 0.40° or more and 6.00° or less.

3. An electronic component comprising a dielectric film according to claim 1.

* * * * *